United States Patent
Sato et al.

(10) Patent No.: US 6,973,132 B2
(45) Date of Patent: Dec. 6, 2005

(54) TRANSMISSION HEADER COMPRESSOR NOT COMPRESSING TRANSMISSION HEADERS ATTACHED TO INTRA-FRAME CODED MOVING-PICTURE DATA

(75) Inventors: Noriyuki Sato, Nara (JP); Toshihisa Nakai, Osaka (JP)

(73) Assignee: Oki Electric Industry Co., Ltd., Tokyo (JP)

(*) Notice: Subject to any disclaimer, the term of this patent is extended or adjusted under 35 U.S.C. 154(b) by 781 days.

(21) Appl. No.: 09/963,556

(22) Filed: Sep. 27, 2001

(65) Prior Publication Data

US 2002/0094027 A1 Jul. 18, 2002

(30) Foreign Application Priority Data

Jan. 15, 2001 (JP) ............................. 2001-005960

(51) Int. Cl.[7] .............................................. H04N 7/12
(52) U.S. Cl. .............................. 375/240.26; 375/240.27
(58) Field of Search ..................... 375/240.27, 240.28, 375/240.26; 714/746, 752; 709/247; 370/392, 370/474, 477, 521

(56) References Cited

U.S. PATENT DOCUMENTS

| | | | | |
|---|---|---|---|---|
| 5,541,852 A | * | 7/1996 | Eyuboglu et al. | ............ 709/232 |
| 2002/0152440 A1 | * | 10/2002 | Yona et al. | .................. 714/746 |
| 2003/0140347 A1 | * | 7/2003 | Varsa | ........................... 725/90 |

OTHER PUBLICATIONS

International Organization for Standardization ISO/IEC/JTC1/SC29/WG11 N0601, MPEG-2 Systems Working Draft, Nov. 1993.
ITU-T Recommendations H. 220.0 General-Purpose Coding Systems for Moving Pictures and Associated Audio, Geneva, 1995.

* cited by examiner

*Primary Examiner*—Vu Le
(74) *Attorney, Agent, or Firm*—Venable LLP; Michael A. Sartori; Jeffrey W. Gluck

(57) ABSTRACT

A transmission header compressor and a moving-picture encoder each include a respective circuit for synchronizing a timing at which the compressor inhibits compression of transmission headers with a timing at which the encoder executes intra-frame coding. A moving-picture transmission system including the compressor and encoder is also disclosed.

16 Claims, 6 Drawing Sheets

TRANSMISSION HEADER COMPRESSOR NOT COMPRESSING TRANSMISSION HEADERS ATTACHED TO INTRA-FRAME CODED MOVING-PICTURE DATA

BACKGROUND OF THE INVENTION

Field of the Invention

The present invention relates to a transmission system for transmitting moving-picture data, and more particularly to a transmission header compressor for compressing a transmission header attached to moving picture data to be transmitted, and a moving-picture data encoder for encoding moving picture data for transmission.

In parallel with the progress of systems for transmitting video data, such as television conference systems, VOD (Video-On-Demand) systems and other video data distribution systems, some different international standards have been proposed that include ITU-T (International Telecommunication Union-Telecommunication Standards Sector) Recommendations H.261, H.262 and H.263, and the ISO (International Organization for Standardization) MPEG (Moving Picture Coding Experts Group) Those international standards are based upon the intra-frame coding and the inter-frame or inter-frame coding for coding picture data.

The IETF (Internet Engineering Task Force) RFC (Request For Comment), which proposes Internet standards, prescribes a real-time protocol (RTP) for Internet in RFC 1889 (A Transport Protocol for Real-Time Applications). The RTP allows video data compressed by any one of the above coding schemes to be transmitted over Internet or similar network. Further, RFC 2508 (Compressing IP/UDP/RTP Headers for Low-Speed Serial Links) describes a method of compressing transmission protocol headers attached to video data to thereby reduce a band to be occupied, so that real-time data can be transmitted over a low-speed serial line. The transmission protocol headers include an IP (Internet Protocol) header, a UDP (User Datagram Protocol) header, and an RTP header.

A conventional method of transmitting moving-picture or movie data with the transmission protocol headers thereof compressed will be described hereinafter. The method to be described is applied to a specific system in which the user of a terminal serially connects the terminal to a dialup server while the dialup server accesses a moving-picture transmission server via an IP network in order to obtain moving-picture data, which the user's terminal can reproduce on a real-time basis.

The moving-picture transmission server or similar server unit capable of sending out moving-picture data are adapted to attach the RTP header, UDP header and IP header to moving-picture data encoded under H.263 or MPEG-4 to packetize the moving-picture data and headers. The transmission server then sends out the resulting IP packet over an IP network.

The IP packet arrives at a dialup router connected to the user's terminal by a serial link in accordance with IP routing. The dialup router includes a header compressor circuit that compresses the RTP header, UDP header and IP header included in the IP packet. The IP packet with the compressed headers is sent out from the dialup router to the user's terminal. In the user's terminal, a header decompressor circuit decompresses the compressed headers of the IP packet while a decoder circuit decodes the packet with the decompressed headers to restore the moving-picture data.

A conventional transmission header compressor/decompressor system will be described with reference to FIGS. 1A, 1B and 1C. FIG. 1A shows a transmission header compressor device 800 interconnected to the Internet 852 and including a header compressor circuit 801 and a serial transmitter circuit 802. FIG. 1B shows a transmission header decompressor device 900 also interconnected to the Internet 852 and including a serial receiver circuit 901 and a header decompressor circuit 902. As shown in FIG. 1C, the header compressor 800 and header decompressor 900 are interconnected with each other via a serial transmission path 850.

In the transmission header compressor 800, the header compressor 801 subtracts from header information, data(n), particular to an IP packet received via the IP network 852 another header information, data(n−1), particular to an IP packet received immediately before to produce difference information, $\Delta(n)$. Also, the header compressor 801 subtracts from the difference information, $\Delta(n)$, another difference information, $\Delta(n-1)$, obtained immediately before to produce difference information, $\Delta\Delta(n)$. The header compressor 801 uses both of the difference information, $\Delta(n)$ and $\Delta\Delta(n)$, as the compressed header information for the header information, data(n), to reconstruct the original headers. The serial transmitter 802 in turn sends out the packet with the reconstructed headers to the serial receiver 901 of the transmission header decompressor 900 in accordance with a communication procedure for serial links.

The serial receiver 901 receives the data, i.e., the packet with the compressed headers in accordance with a certain communication procedure and transfers the data to the header decompressor 902. The header decompressor 902 stores the header information, data (n−1), and the difference information, $\Delta(n-1)$, relating to a packet received immediately before. The decompressor 902 decompresses the compressed headers on the basis of the difference information, $\Delta(n)$ and $\Delta\Delta(n)$, to reproduce the original header information, data (n).

Further, the header compressor 801 allots serial numbers to consecutive packets each including compressed headers while sending out the packets with the serial numbers thus allotted. If the header decompressor 902 detects the serial numbers not continuous, then it determines the loss of a packet having occurred on the serial link. In addition, when the check sum of a received packet is not detected correctly, the header decompressor 902 discards the packet.

If a packet is lost due to an error having occurred on the serial link or discarded by the header decompressor, then the header decompressor 902 cannot decompress following packets received after the packet lost or discarded but continuously discards consecutive packets thus following until a packet with non-compressed headers included arrives. The header compressor 801 is adapted to periodically send out packets including non-compressed headers in order to enable the decompressor 900 to recover synchronization.

More specifically, when the header compressor 801 sends out moving-picture data compressed under H.263 or MPEG-4, the moving-picture data are encoded by means of the intra-frame coding. Therefore, when a frame that cannot be recovered by decoding appears due to, e.g., loss on a transmission path, pictures cannot correctly be reproduced due to failure in decoding consecutive frames received after the earlier-mentioned frame until an intra-frame coded picture data arrive. This is why the header compressor 801 is adapted to periodically execute intra-frame coding.

When a packet with compressed headers is lost on a transmission path, a moving-picture decoder device, not shown, located downstream of the header decompressor 900 cannot decode picture data to reproduce pictures until it receives intra-frame coded data derived from a packet with non-compressed headers.

FIG. 2 is a timing chart schematically showing the timings of non-compressed transmission headers and intra-frame coded moving-picture data. In FIG. 2, lines 1, 2 and 3 indicate on a time axis that the top line 1 includes times 1a, 1b and 1c at which non-compressed headers arrive while the intermediate line 2 includes times 2a, 2b, 2c and 2d at which intra-frame coded moving-picture data arrive.

In FIG. 2, assume that the packet arriving at the time 3a is lost due to, e.g., an error having occurred on a transmission path. Then, the header decompressor 902 will continuously discard following packets because it cannot decompress compressed headers until a packet with non-compressed headers arrives at the time 1b. The header decompressor 902 correctly decompresses headers after the time 1b. However, the moving-picture decoder device following the decompressor 902 cannot correctly decode moving-picture data due to the loss of moving-picture data to be referenced. More specifically, when an error occurs at the time 3a, the moving-picture decoder device cannot reproduce a correct picture over a period of time 4.

Further, if another error occurs at the time 3b after the error occurred at the time 3a, the moving-picture decoder device then cannot reproduce a correct picture until it receives a packet with non-compressed transmission headers at the time 1c to recover its header expansion ability and thereafter receives intra-frame coded moving-picture data at the time 2d, i.e., over a period of time 5.

Moreover, so long as transmission headers are correctly decompressed, the transmission header decompressor 900 sends out even picture data that cannot be used for the correct reproduction of pictures over the transmission path, thus wastefully occupying the transmission band thereof.

SUMMARY OF THE INVENTION

It is therefore an object of the present invention to provide a transmission header compressor in which a period of time necessary for the recovery of correctly decoding picture data can be reduced even when a packet is lost which includes intra-frame coded moving-picture data in its data field and having compressed headers.

It is another object of the present invention to provide a transmission header compressor in which a transmission band to be wastefully occupied by packets that cannot be used to decode moving-picture data can be minimized.

In accordance with the present invention, a transmission header compressing device receives a moving-picture signal including coded moving-picture data and a transmission header, compresses the transmission header to transmit the moving-picture data selectively with compressed transmission header. The transmission header compressing device includes a compression control circuit for determining whether or not the moving-picture data included in the moving-picture signal are subjected to intra-frame coding and inhibits, if the moving-picture data are subjected to intra-frame coding, the header from being compressed.

Also, in accordance with the present invention, a transmission header compressing device directed for the same purpose as the above-described compressing device includes a compression control circuit for inhibiting the compression of the transmission header of a moving-picture signal in accordance with a rule. An inhibition information transmitter transmits at least information indicative of the inhibition of compression to a moving-picture coding device that has transmitted the moving-picture signal.

Further, in accordance with the present invention, a moving-picture coding device selectively codes moving-picture data by intra-frame coding or inter-frame coding in dependence upon the content of the moving-picture data and attaches a transmission header to the resulting coded moving-picture data to output a moving-picture signal. A decision information producing circuit produces information to be used for determining whether or not to inhibit the compression of the transmission header in dependence upon whether or not intra-frame coding is executed. The producing circuit then transmits the information to a transmission header compressing device, which follows the moving-picture coding device for compressing the transmission header.

Furthermore, in accordance with the present invention, a moving-picture coding device directed for the same purpose as the above-described moving-picture coding device includes an inhibition information receiver for receiving at least decision information indicative of the inhibition of compression of the transmission headers from a transmission header compressing device, which follows the moving-picture coding device for compressing the transmission header. A coding control circuit causes intra-frame coding to be selected when the inhibition information receiver receives the decision information.

Moreover, in accordance with the present invention, a moving-picture transmission system includes any one of the moving-picture coding devices described above and any one of the transmission header compressing devices also described above.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 3:
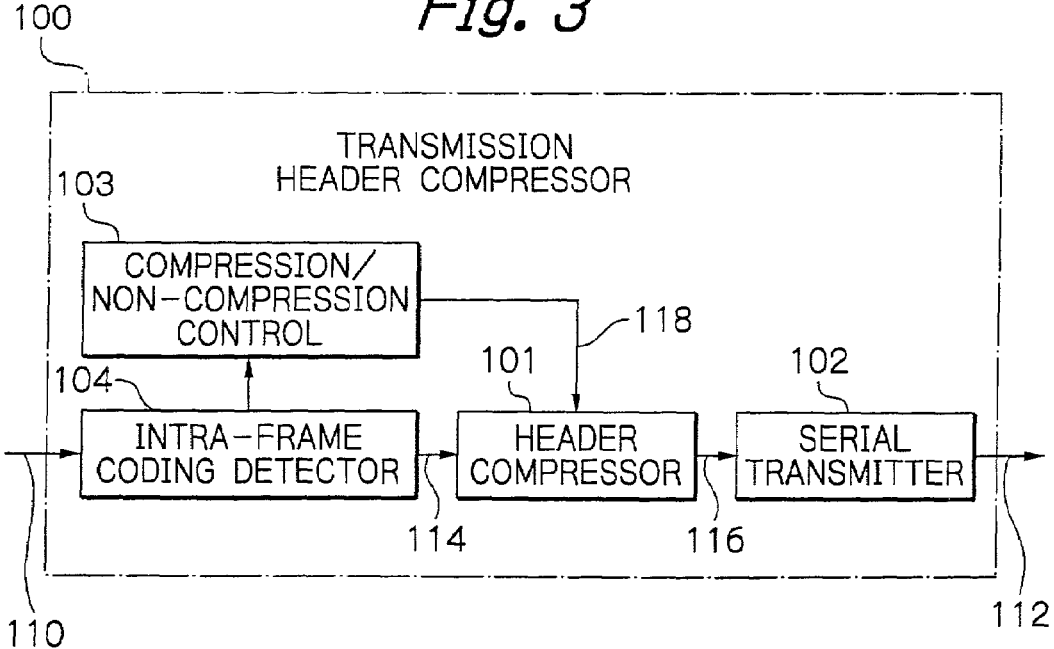
FIG. 3 is a schematic block diagram showing an embodiment of a transmission header compressor in accordance with the present invention.

Referring to FIG. 3 of the accompanying drawings, the illustrative embodiment of a transmission header compressor in accordance with the present invention, as well as other embodiments to follow, are practicable with any kind of network or transmission protocol, and will be described in relation to a specific type of network.

Briefly, the illustrative embodiment is implemented as a transmission header compression device of the type compressing the headers of an RTP (Real-Time Protocol) packet received via an IP (Internet Protocol) network and sending out the compressed headers to a terminal over, e.g., a serial link. In the illustrative embodiment, the compressor determines, based on the header information of moving-picture data, whether or not the data included in the RTP packet is intra-frame coded moving-picture data. The compressor does not compress the headers if the answer of the above decision is positive, or otherwise does and sends out the packet with compressed headers to a serial link.

As shown in FIG. 3, the transmission header compressor, generally denoted with a reference numeral 100, is generally made up of an intra-frame coding detector circuit 104, a header compressor circuit 101 connected to an intra-frame coding detector circuit 104 by a connection 114, a serial transmitter circuit 102 connected to the header compressor 101 by a connection 116, and a compression/non-compression control circuit 103 connected to the header compressor 101 and the intra-frame coding detector 104 by connections 118 and 120, respectively. Similar to the network system shown in FIG. 1C, the compressor 100 has its upstream side 110 interconnected to a moving-picture encoder device, not shown, via an IP network, and its downstream side 112 interconnected to a transmission header decompressor device, not shown, by a serial transmission line. Further, the transmission header decompressor device is interconnected to a moving-picture decoder device, not shown, via an IP network.

When IP packets are input to the intra-frame coding detector 104 via the IP network 110, the intra-frame coding detector 104 reads the header information of IP, UDP (User Datagram Protocol) and RTP headers and moving-picture data, which are included in the received packet. If the packet includes intra-frame coded data, or inter-frame or predictive coded data in its data field, then the intra-frame detector 104 reports the compression/non-compression control 103 accordingly, i.e. of the presence of the intra-frame coded data or the inter-frame coded data, via the connection 120. In the following, a signal is denoted with a reference numeral allotted to a connection on which the signal is conveyed. It is to be noted that the intra-frame coding detector 104 may simply report only the receipt of the packet 110 to the compression/non-compression control 103 if the data are inter-frame coded data. The crux is that the compression/non-compression control 103 be capable of distinguishing intra-frame coded data from inter-frame coded data. The intra-frame coding detector 104 simply delivers the received packet to the header compressor 101 via the connection 114.

The compression/non-compression control 103 feeds a compression control signal 118 to the header compressor 101. The compression control signal 118 inhibits the header compressor 101 from compressing the headers if the received packet 110 includes intra-frame coded data or allows it to compress headers if it includes inter-frame coded data. Alternatively, the compression/non-compression control 103 may be configured to feed only the compression control signal 118 representing that the header compressor 101 is to be inhibited from compression. In such a case, the header compressor 101 will determine that it is allowed to compress headers when the control signal 118 is absent or not significant.

Figure 1A:
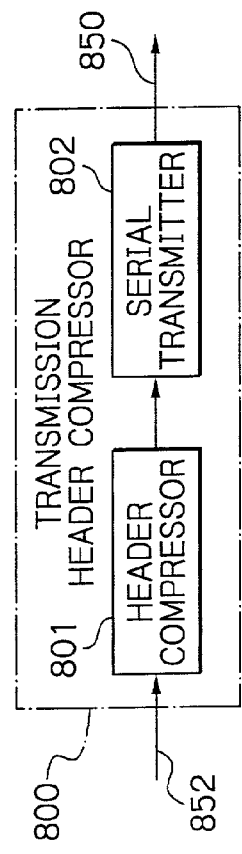
FIG. 1A is a schematic block diagram showing a transmission header compressor included in a conventional transmission header compressor/decompressor system.

When the header compressor 101 receives the control signal 118 that allows header compression, the compressor 101, like the conventional header compressor 801 shown in FIG. 1A, delivers the packet with headers compressed or non-compressed to the serial transmitter 102 via the connection 116. When the header compressor 101 receives the compression control signal 118 that inhibits header compression, the compressor 101 simply delivers the packet 110 to the serial transmitter 102 without compressing the headers.

The serial transmitter 102 in turn outputs the packet 116 received from the header compressor 101 to the serial link 112 in accordance with a communication procedure for serial links in substantially the same manner as the conventional serial transmitter 802, FIG. 1A.

In operation, an IP packet 110 arrived via the IP network is input to the intra-frame coding detector 104. Assume that the received packet 110 includes intra-frame coded moving-picture data in its data field. Then, the intra-frame coding detector 104 informs the compression/non-compression control 103 of the presence of the intra-frame coded moving-picture data. In response, the control circuit 103 feeds the compression control signal 118 that inhibits header compression to the header compressor 101. The header compressor 101 therefore simply transfers the packet 114 input from the intra-frame coding detector 104 to the serial transmitter 102 without compressing the headers of the packet. The serial transmitter 102 sends out the non-compressed packet to the serial link 112.

On the other hand, when the received packet includes inter-frame coded moving-picture data in its data field, the intra-frame coding detector 104 reports the presence of the inter frame coded moving-picture data to the compression/non-compression control 103. In response, the control circuit 103 feeds the compression control signal 118 that allows header compression to the header compressor 101. In this case, the header compressor 101 compresses the headers of the packet 114 or alternatively does not compress them in the allowed condition. The resulting packet 116 is sent to the serial link 112 via the serial transmitter 102.

The header compressor 101 may be constructed to compress the headers of all received packets without exception when compression is allowed. Alternatively, the compressor 101 may be adapted to deliver, even when compression is allowed, non-compressed packets to the serial transmitter 102 at, e.g., a preselected time interval. This can be implemented by the compressor 101 having a counter or a timer included therein. In an application in which the compressor 101 is constructed to compress all received packets when compression is allowed, the serial transmitter 102 is adapted to output non-compressed packets in the inhibition state set in response to the compression control signal 118 provided from the control circuit 103. Consequently, the serial transmitter 102 outputs non-compressed packets at adequate intervals, e.g., at the intra-frame coding period.

As stated above, when the received packet includes intra-frame coded moving-picture data in its data field, the packet is sent to the transmission header decompressor device, which follows the transmission header compressor 100, with non-compressed headers included. Therefore, even if the packet is lost due to an error occurring on the path to the transmission header decompressor device, a timing at which compressed headers can be decompressed accurately matches a timing at which moving-picture data can be adequately decoded. This reduces a period of time required up to the recovery of decoding moving-picture data. Further, it rarely occurs that packets which could otherwise not be used for decoding moving-picture data wastefully occupy the transmission band between the transmission header decompressor device and the moving-picture decoder device.

Figure 2:
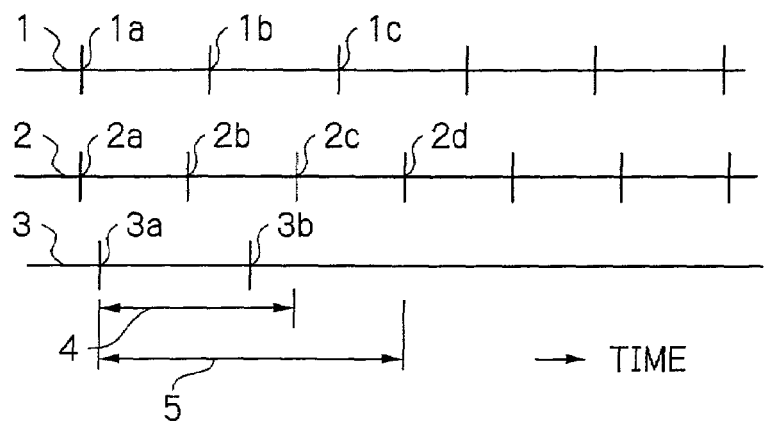
FIG. 2 is a timing chart useful for understanding the problems of the conventional system shown in FIGS. 1A, 1B and 1C.
Figure 4:
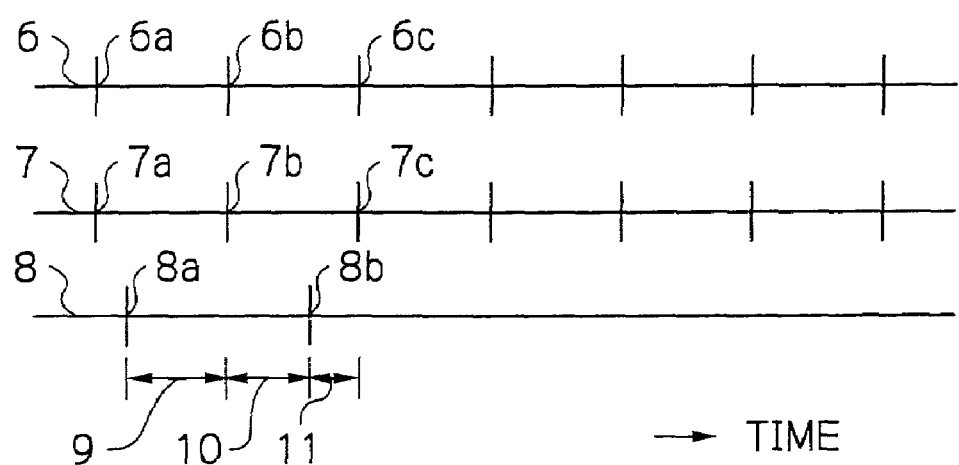
FIG. 4 is a timing chart, similar to FIG. 2, useful for understanding the advantages of the illustrative embodiment over the conventional transmission header compressor.

The above-mentioned advantages of the illustrative embodiment will be described more specifically by comparing FIG. 2 with FIG. 4 that pertains to the illustrative embodiment. In FIG. 4, horizontal lines 6, 7 and 8 indicate time. Also, times 1a, 1b and 1c on the top line 6 are representative of the timing of non-compressed headers while times 7a, 7b and 7c on the intermediate line 7 are of the timing of intra-frame coded moving-picture data.

In the conventional transmission header compressor, the timing at which headers are not compressed and the timing at which intra-frame coded data are inserted in packets are not related to each other, as discussed with reference to FIG. 2. Therefore, when a packet is lost by way of example, a substantial period of time is consumed up to recovery of correct reproduction of moving pictures.

Figure 1B:
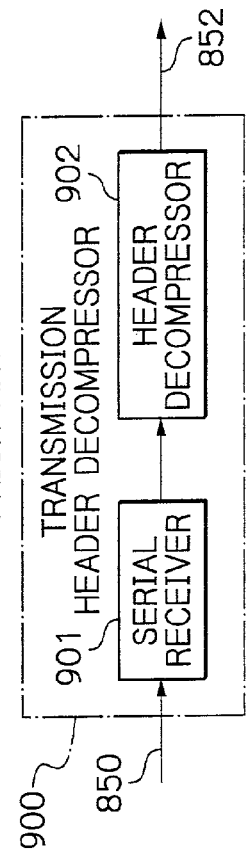
FIG. 1B is a schematic block diagram showing a transmission header decompressor also included in the conventional system of FIG. 1A.
Figure 1C:
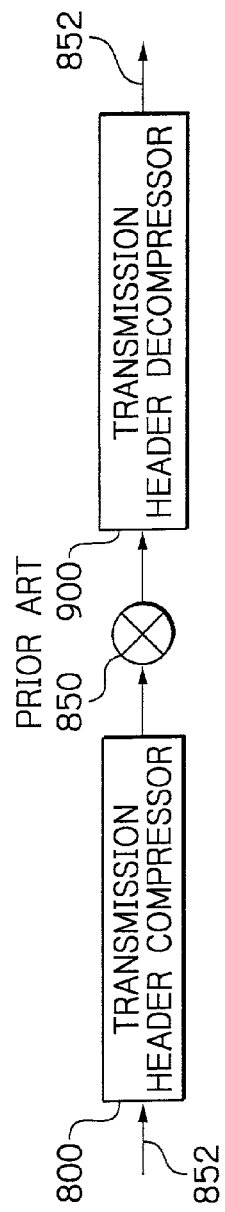
FIG. 1C is a schematic block diagram showing the compressor of FIG. 1A and the decompressor of FIG. 1B interconnected with each other via a transmission path.

Assume that a packet at the time 8a shown in FIG. 4 is also lost due to an error on the transmission path. Then, compressed headers cannot be decompressed until a packet with non-compressed headers arrives at the time 6b. As a result, the header decompressor 902, FIG. 1B, continuously discards consecutive packets and prevents image data from reaching the moving-picture decoder device.

By contrast, on receiving the packet with non-compressed headers at the time 6b, the transmission header compressor 100 of the illustrative embodiment can correctly output data following the above-mentioned packet. This, coupled with the fact that the intra-frame coded data are transmitted at the same timing as packets with non-compressed headers, allows the intra-frame coded data to be surely sent to the moving-picture decoder device. The moving-picture decoder device can therefore reproduce correct moving pictures. In the illustrative embodiment, such recovery completes in a period of time 9 that is far shorter than the conventional period of time 4, FIG. 2.

Further, assume that a packet at the time 8b is lost in addition to the packet at the time 8a. Then, consecutive packets appearing over a period of time 10, which starts at the time of recovery, are used to reproduce correct moving pictures. The transmission header decompressor device discards packets after the time 8b until the receipt of a packet at the time 6c. However, packets appearing after the time 6c are used to decode correct moving-picture data, as stated above, so that moving pictures can be reproduced. In the conventional scheme shown in FIG. 2, all the packets appearing over the period of time 5 cannot be used to decode moving-picture data. The sum of the periods of times 9 and 11 particular to the illustrative embodiment is far shorter than the period of time 5.

In the transmission header compressor 100, FIG. 3, the intra-frame coding detector 104 detects intra-frame coding on the basis of header information attached to moving-picture data 110. Alternatively, the compressor 100 may be adapted to analyze the construction of moving-picture data 110 to thereby determine the intra-frame coded ratio of the moving-picture data 110, and not execute compression when the intra-frame coded ratio exceeds a threshold of intra-frame coded ratio as with intra-frame coded data. Moving-picture data may include, e.g., information showing which of intra-frame coding and inter-frame coding has been executed block by block.

An alternative embodiment of the present invention will be described with reference to FIG. 5. Briefly, the alternative embodiment solves the problems encountered with the conventional moving-picture transmission system in cooperation with a moving-picture encoder device.

Figure 5:
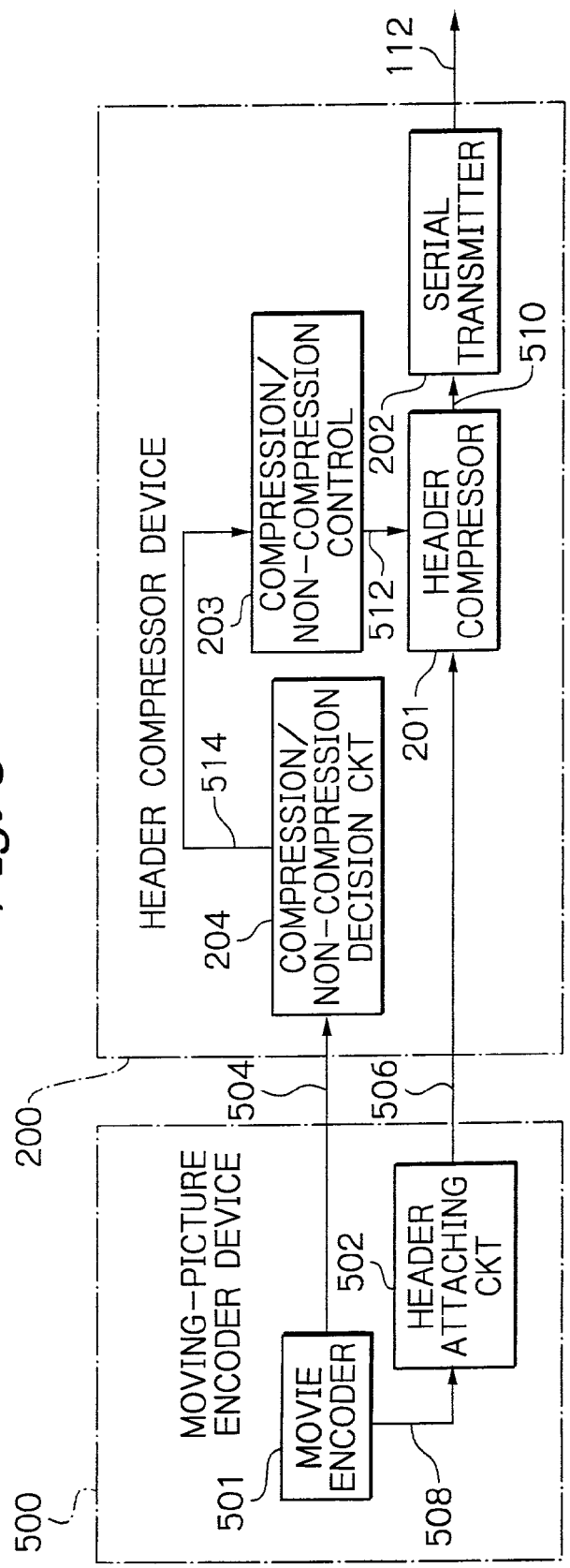
FIG. 5 is a schematic block diagram showing an alternative embodiment of the present invention.

In the embodiment shown in FIG. 5, a moving-picture encoder device 500 is directly connected to a transmission header compressor device 200 by connections 504 and 506. The moving-picture encoder device 500 includes a moving-picture or movie encoder subsection 501 interconnected to the header compressor device 200 by the connection 504, and a header attaching circuit 502 interconnected to the moving-picture encoder 501 by a connection 508. The transmission header compressor device 200 includes a header compressor subsection 201 interconnected to the header attaching circuit 502 by the connection 506, a serial transmitter 202 interconnected to the header compressor 201 by a connection 510, a compression/non-compression control 203 interconnected to the header compressor 210 by a connection 512, and a compression/non-compression decision circuit 204 interconnected to the moving-picture encoder 501 by the connection 504 and also to the decision circuit 204 by a connection 514.

In the illustrative embodiment, the moving-picture encoder 501 executes intra-frame coding or inter-frame coding with input moving-picture data on a block of data, such as a macroblock or a block, basis. Specifically, a single picture is divided into a plurality of regions each having a predetermined size in horizontal and vertical directions. A block, or macroblock, refers to each of such regions. The moving-picture encoder 501 delivers the compressed moving-picture data 508 to the header attaching circuit 502. This function of the moving-picture encoder 501 is conventional.

The data attaching circuit 502 attaches headers to the compressed moving-picture data 508 input from the moving-picture encoder 501, thereby completing a packet. The packet is sent to the transmission header compressor device 200 on the connection line 506. A packet refers to such a combination of coded moving-picture data and headers.

In the illustrative embodiment, the moving-picture encoder 501 additionally functions to calculate the ratio of intra-frame coded blocks of data to the entire data of a frame and report the ratio to the transmission header compressor device 200 over the connection line 504. Let this ratio be referred to as an intra-frame coded ratio for simplicity. The data 504 representative of an intra-frame coded ratio is sent from the moving-picture encoder 501 to the compression/non-compression decision circuit 204 included in the transmission header compressor device 200.

The compression/non-compression decision circuit 204 determines whether or not the received intra-frame coded ratio is higher than a preselected threshold. If a received intra-frame coded ratio is higher than the threshold, the decision circuit 204 then notifies the compression/non-compression control 203 of the intra-frame coded ratio thus determined as well as of the inclusion of intra-frame coded data in the data field of a packet received from the moving-picture encoder device 500.

As for the threshold of intra-frame coded ratio, the illustrative embodiment is adapted to determine that picture data are of intra-frame coded even when some blocks thereof are inter-frame coded. Therefore, with the illustrative embodiment, a threshold for the intra-frame coded ratio is advantageously selected at a considerably high value.

The function of the compression/non-compression decision circuit 204 assigned in the embodiment to the transmission header compressor device 200 may alternatively be assigned to the moving-picture encoder device 500, e.g., to the moving-picture encoder 501, if desired. In such a case, the moving-picture encoder device 500 will directly notify the compression/non-compression control 203 of whether or not the entire data of a packet can be regarded as intra-frame coded data. Further, the system may be adapted to permit the compression/non-compression decision circuit 204, rather than the moving-picture encoder device 500, to produce an intra-frame coded ratio from a packet received.

When the data of the received packet is intra-frame coded data, as reported by the compression/non-compression decision circuit 204, the compression/non-compression control 203 feeds to the header compressor 201 the control signal 512 that inhibits compression. When the compression/non-compression control 203 does not receive such a report, it continuously feeds to the header compressor 201 the control signal 512 that allows compression.

When the compression control signal 512 output from the compression/non-compression control 203 inhibits compression, the header compressor 201 simply transfers the packet 506 input from the moving-picture encoder device 500 to the serial transmitter 202 without compressing the headers of the packet via the connection 510. The serial transmitter 202 in turn sends out the non-compressed packet 510 to the serial link 112 in accordance with the communication procedure for serial links. When the compression control signal 512 allows compression, the header compressor 201 compresses the headers of the packet 506 under a compression/non-compression rule assigned thereto. The packet 510 with the compressed headers is sent to the serial link 112 via the serial transmitter 202.

The header compressor 201 may be configured such that it is usually automatically allowed to execute compression (sometimes non-compression) with consecutive packets, but inhibited from doing so when the compression control signal 512 explicitly inhibits compression. In such an application, the compression/non-compression control 203 will output only the significant compression control signal 512 that inhibits compression.

The operation of the alternative embodiment will be described hereinafter. In the moving-picture encoder device 500, the moving-picture encoder 501 intra-frame or interframe encodes moving-picture data to be sent on a block by block basis. The header attaching circuit 502 attaches transmission headers to the thus coded moving-picture data 508 output from the moving-picture encoder 501 to produce a packet. The header attaching circuit 502 then delivers the packet 506 to the transmission header compressor device 200. At the same time, the moving-picture encoder 501 determines the intra-frame coded ratio of the picture data and sends out data representative of the latter to the transmission header compressor device 200.

In the transmission header compressor device 200, the compression/non-compression decision circuit 204 determines whether or not the intra-frame coded ratio reported by the moving-picture encoder device 500 is higher than the threshold of intra-frame coded ratio. If the actual intra-frame coded ratio is higher than the threshold of intra-frame coded ratio, then the decision circuit 204 reports that the packet 506 received from the moving-picture encoder device 500 contains intra-frame coded data in its data field to the compression/non-compression controller 203. In response, the compression/non-compression controller 203 feeds the compression control signal 512 that inhibits compression to the header compressor 201. In turn, the header compressor 201 simply transfers the input packet 510 to the serial transmitter 202 without compressing its headers. The serial transmitter 202 outputs the packet to the serial link 112.

On the other hand, if the actual intra-frame coded ratio reported by the moving-picture encoder 500 is lower than or equal to the threshold of intra-frame coded ratio, the compression/non-compression decision circuit 204 recognizes that situation, and reports it to the compression/non-compression control 203. In this case, the control circuit 203 maintains the header compressor 201 in the usual allowed condition via the connection 514. The header compressor 201 accordingly compresses or not the input packet 506 in the allowed condition. The packet 510 output from the header compressor 201 is sent out to the serial link 112 via the serial transmitter 202.

The alternative embodiment achieves substantially the same advantages as the previous embodiment. Specifically, if the moving-picture encoder 500 intra-frame encodes moving-picture data only in some of the blocks constituting a frame of data with the ratio of the intra-frame coded blocks to the entire data of the frame maintained high, the transmission header encoder device 200 does not compress the headers of the packet containing the above-mentioned moving-picture data.

Figure 6A:
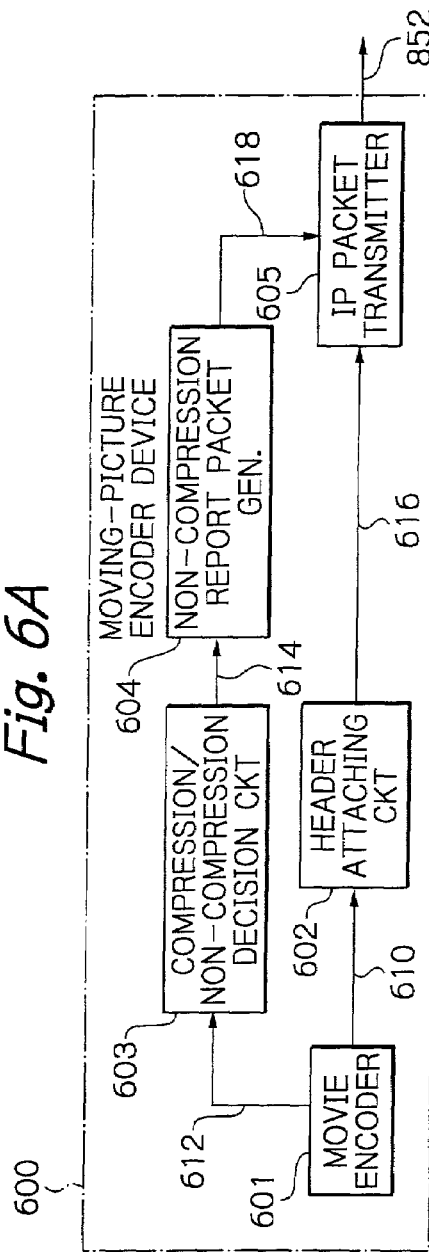
FIGS. 6A and 6B are schematic block diagrams showing another alternative embodiment of the present invention.
Figure 6B:
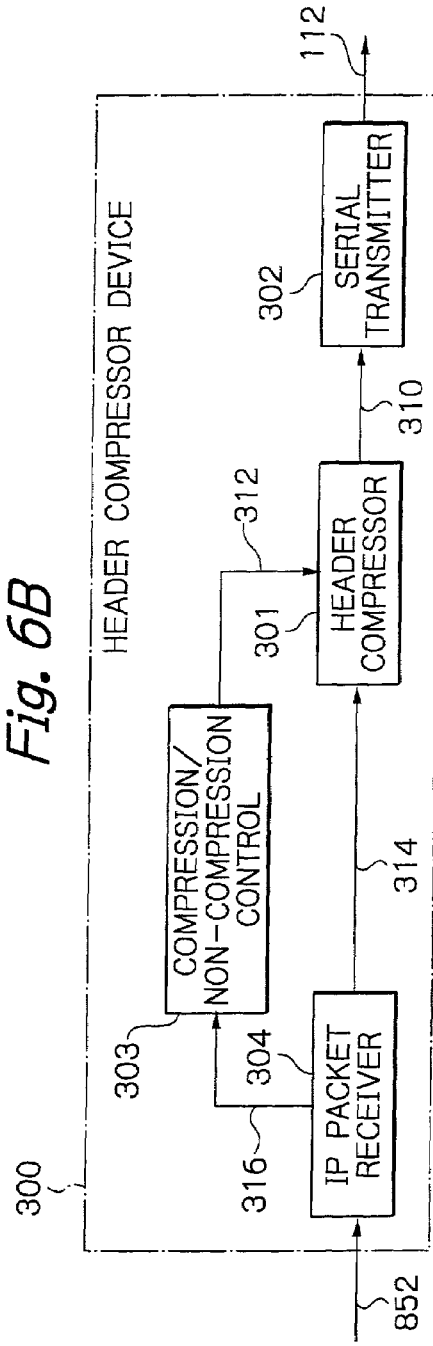

Reference will now be made to FIGS. 6A and 6B for describing another alternative embodiment of the present invention. This embodiment, like the embodiment described with reference to FIG. 5, causes a transmission header compressor device in cooperation with a moving-picture encoder device to solve the problems of the conventional moving-picture transmission system. The embodiment to be described is, however, characterized in that the moving-picture encoder and transmission header compressor are interconnected via an IP network, as different from the embodiment described with reference to FIG. 5 which includes the moving-picture encoder device directly connected to the downstream transmission header compressor device.

As shown in FIG. 6A, a moving-picture encoder device 600 is generally made up of a moving-picture encoder 601, a header attaching circuit 602 interconnected to the moving-picture encoder 601 by a connection 610, a compression/non-compression decision circuit 603 interconnected to the moving-picture encoder 601 by a connection 612, a non-compression report packet generator 604 interconnected to the decision circuit 610 by a connection 614, and an IP packet transmitter 605 interconnected to the header attaching circuit 602 and the report packet generator 604 by connections 616 and 618, respectively, as illustrated. The moving-picture encoder 600 is adapted to send out IP packets over the IP network 852 to a transmission header compressor device 300, FIG. 6B.

The transmission header compressor device 300 includes a header compressor 301, a serial transmitter 302 interconnected to the header compressor 301 by a connection 310, a compression/non-compression control 303 interconnected to the header compressor 301 by a connection 312, and an IP packet receiver 304 has its input port interconnected to the Internet 852 and its output ports 314 and 316 interconnected to the header compressor 301 and control circuit 303, respectively, as illustrated. The serial transmitter 302 has its output port interconnected to the serial transmission line 112 and is adapted to transmit packets over the serial transmission line 112 in accordance with a communication procedure for serial links.

In the moving-picture encoder device 600, the moving-picture encoder 601, like the moving-picture encoder 501 of the previous embodiment, intra-frame or inter-frame codes moving-picture data on a block by block basis and feeds the coded moving-picture data 610 to the header attaching circuit 602. At the same time, the moving-picture encoder 601 determines the intra-frame coded ratio of the coded moving-picture data, and data representative of the intra-frame coded ratio thus determined to the compression/non-compression decision circuit 603 via the connection 612.

Figure 7:
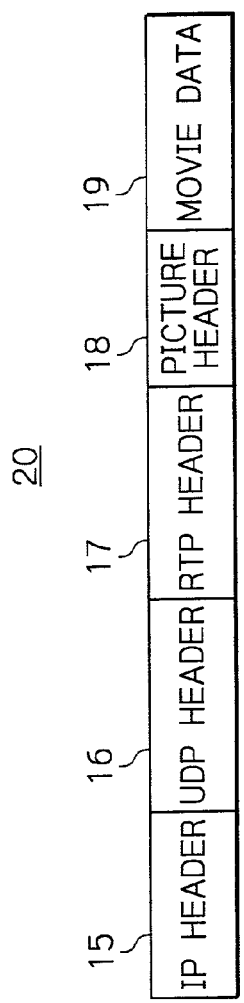
FIG. 7 shows an example of the format of an IP packet.

The header attaching circuit 602 attaches transmission headers to the moving-picture data 610 received from the moving-picture encoder 601 to assemble an IP packet 20, FIG. 7. The IP packet 20 thus assembled is input via the connection 616 to the IP packet transmitter 605. FIG. 7 exemplarily shows the format of the IP packet 20 output from the header attaching circuit 602 in the instant embodiment. As shown, the IP packet 20 includes an IP header 15, a UDP header 16, an RTP header, a picture header 18, and moving-picture or movie data field 19.

The compression/non-compression decision circuit 603 compares the intra-frame coded ratio 612 reported by the moving-picture encoder 601 with a preselected threshold of intra-frame coded ratio. The decision circuit 603 then delivers a signal representative of the result of comparison, i.e. a decision signal 614, to the non-compression packet generator 604.

The compression/non-compression decision circuit 603 may have either one of the following two different configurations. A first configuration is such that the decision circuit 603 outputs, when the actual intra-frame coded ratio is higher than the threshold of intra-frame coded ratio, a decision signal 614 showing that the moving-picture data 612 fed from the moving-picture encoder 601 to the header attaching circuit 602 is intra-frame coded data, or outputs, when the ratio is lower than or equal to the threshold, a decision signal showing 614 that the above-mentioned moving-picture data 610 are not intra-frame coded data. A second, alternative configuration is such that the decision circuit 603 outputs, when the actual intra-frame coded ratio is higher than the threshold of intra-frame coded ratio, a decision signal 614 indicating that the moving-picture data 610 are intra-frame coded data, or otherwise not, i.e. when the ratio is lower than or equal to the threshold. The operation of the illustrative embodiment will be described later in respect of the second configuration.

The non-compression report packet generator 604 generates a non-compression report packet 618 in accordance with the decision signal 614 output from the compression/non-compression decision circuit 603. The non-compression report packet 618 is input to the IP packet transmitter 605. The non-compression report packet generator 604 may be adapted to selectively output a non-compression report packet 618 inhibiting compression or a non-compression report packet 618 allowing compression in accordance with the decision signal 614. Alternatively, the circuit 604 may be adapted to output a non-compression packet 618 inhibiting compression only when the decision signal 614 is indicative of intra-frame coding. The operation of the illustrative embodiment will be described later with respect to the latter configuration, as distinguished from the former configuration.

The IP packet transmitter 605 sends out the IP packet 20 and the non-compression report packet 618 output from the header attaching circuit 602 and non-compression report packet generator 604, respectively, over the IP network 852.

The non-compression report packet may follow the moving-picture data 19 included in the IP packet 20 shown in FIG. 7.

The transmission header compressor device 300 receives the IP packet 20 and the non-compression report packet from the moving-picture encoder device 600 via the IP network 852. The IP packet receiver 304 having received the IP packet 20 determines whether or not the IP packet 20 is followed by, or includes, a non-compression report packet. If the IP packet is followed by, or includes, the report packet, then the receiver 304 feeds the content of the report packet in the form of a non-compression report signal 316 to the compression/non-compression control 303. At the same time, the receiver 304 removes the report packet from the IP packet 20 and delivers the IP packet 20 to the header compressor 301. If the IP packet 20 does not include, or is not followed by, the report packet, then the receiver 304 simply, i.e. without issuing a significant signal 136 to the control circuit 303, transfers the received IP packet 314 to the header compressor 301.

The IP packet receiver 304 may be configured such that only when the content of the non-compression report packet is indicative of non-compression (meaning compression inhibited due to intra-frame coding), the receiver 304 reports the compression/non-compression control 303 accordingly. Alternatively, the receiver 304 may be adapted to report the control circuit 303 in both of the situations, namely, non-compression (inhibition) and compression (allowance).

The header compressor 301, serial transmitter 302 and compression/non-compression control 303 operate in exactly the same manner as in the previous embodiment described with reference to FIG. 5.

The operation of the instant, alternative embodiment will be described hereinafter. In the moving-picture encoder device 600, the moving-picture encoder 601 intra-frame or inter-frame codes moving-picture data block by block and feeds the coded moving-picture data 610 to the header attaching circuit 602. At the same time, the moving-picture encoder 601 determines the intra-frame coded ratio of the coded moving-picture data and delivers information representing the determined ratio 612 to the compression/non-compression decision circuit 603. The header attaching circuit 602 attaches transmission headers to the moving-picture data 610 to produce an IP packet 20 on its output port 616. The IP packet 20 is input to the IP packet transmitter 605.

The compression/non-compression decision circuit 603 determines whether or not the actual intra-frame coded ratio 612 is higher than the threshold of intra-frame coded ratio. If the actual intra-frame coded ratio 612 is higher than the threshold of intra-frame coded ratio, then the decision circuit 603 feeds the previously mentioned decision signal 614 to the non-compression packet generator 604. In response, the non-compression packet generator 604 generates a non-compression report packet 618. The IP packet transmitter 605 adds the non-compression report packet 618 to the IP packet 20 provided from the attaching circuit 602 and then sends out the IP packet together with the report packet over the IP network 852.

If the actual intra-frame coded ratio is lower than or equal to the threshold of intra-frame coded ratio, then the compression/non-compression decision circuit 603 does not output the decision signal 614. The non-compression report packet generator 604 therefore does not generate the non-compression report packet 618. It follows that the IP packet transmitter 605 forwards only the IP packet 20 output from the header attaching circuit 602 over the IP network 852.

Upon receiving the IP packet 20 via the IP network 852, the IP packet receiver 304 included in the transmission header compressor device 300 determines whether or not the IP packet 20 is followed by, or includes, a non-compression report packet. If the IP packet 20 is followed by, or includes, the report packet, then the receiver 304 feeds the IP packet 20 to the header compressor 301 after removing the non-compression report packet. At the same time, the receiver 304 notifies the compression/non-compression control 303 of the non-compression. In response, the control circuit 303 feeds a compression control signal 312 inhibiting compression to the header compressor 301. In turn, the IP packet 20 with non-compressed headers is sent to the serial link 112 via the serial transmitter 301.

If the IP packet 20 does not include the non-compression report packet, then the IP packet receiver 304 transfers the received IP packet 20 to the header compressor 301. However, the receiver 304 delivers no significant report signal to the compression/non-compression control 303. The header compressor 301 compresses, or not, the IP packet accordingly in the allowed condition. The IP packet 310 output from the header compressor 301 will be sent out to the serial link 112 via the serial transmitter 302.

The present, alternative embodiment achieves the same advantages as the embodiment described with reference to FIG. 5 despite that the moving-picture encoder device 600 and transmission header compressor device 300 are interconnected via the IP network 852.

The embodiments shown in FIGS. 3, 5, and 6A and 6B, are each adapted to detect intra-frame coding. Alternatively, the embodiments each may be adapted to detect inter-frame coding for thereby controlling compression/non-compression. However, detecting inter-frame coding is considered equivalent to detecting intra-frame coding; in this sense, the latter concept includes the former concept as well.

Still another alternative embodiment of the present invention will be described with reference to FIG. 8. The foregoing embodiments are constructed to selectively inhibit or allow the compression of transmission headers in accordance with a moving-picture coding system adopted. By contrast, the embodiment to be described hereinafter is adapted to control the moving-picture coding system in accordance with the compression/non-compression of transmission headers.

Figure 8:
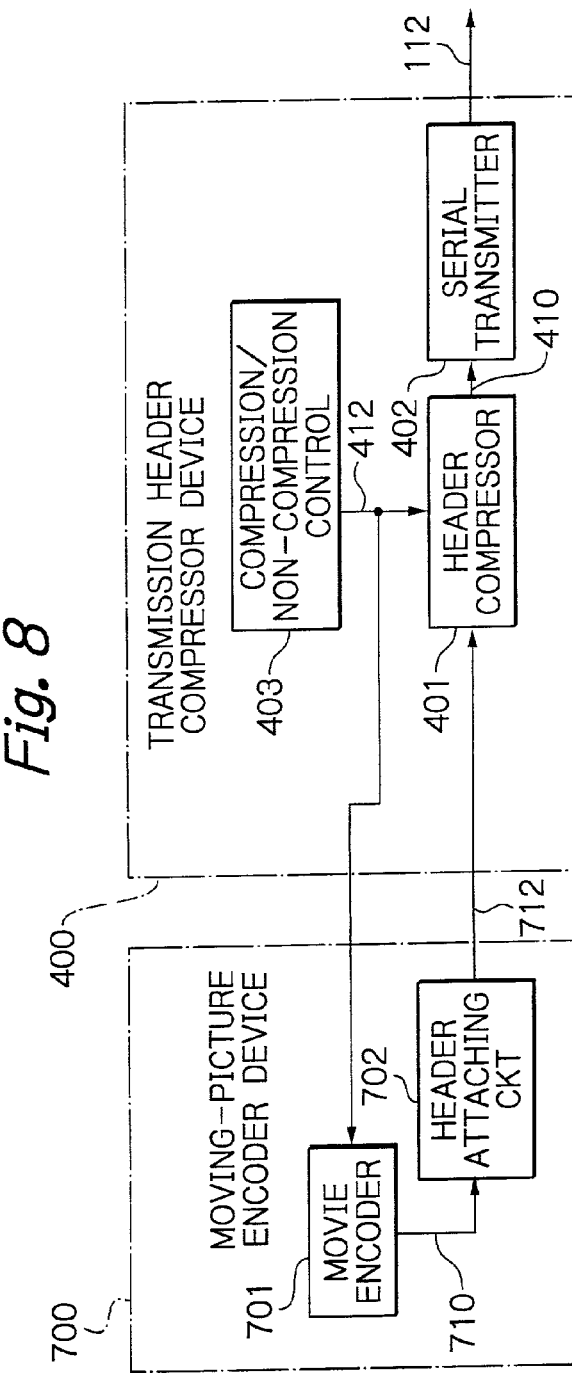
FIG. 8 is a schematic block diagram, similar to FIG. 5, showing still another embodiment of the present invention.

As shown in FIG. 8, a moving-picture encoder device 700 includes a moving-picture encoder 701 and a header attaching circuit 702 interconnected to the moving-picture encoder 701 by a connection 710. The moving-picture encoder device 700 is interconnected to a transmission header compressor device 400 by connections 712 and 412, as illustrated. The transmission header compressor device 400 includes a header compressor 401 interconnected to the header attaching circuit 702 by the connection 712, a serial transmitter 402 interconnected to the header compressor 401 by a connection 410, and a compression/non-compression control 403 interconnected to the header compressor 401 and the moving-picture encoder 701 by the connection 412 as shown in the figure.

The moving-picture encoder 701 encodes moving-picture data and delivers the coded moving-picture data 710 to the header attaching circuit 702, as in the previous embodiments. In the illustrative embodiment, the moving-picture encoder 701 is adapted to unconditionally intra-frame code some of the moving-picture data whenever it receives a compression control signal indicative of non-compression on the line 412 from the transmission header compressor 400. More specifically, when the moving-picture encoder 701 may be adapted to execute intra-frame coding a frame of data appearing at the time when it receives the compression coding signal 412 indicative of non-compression, and a predetermined number of frames of data following the preceding frame of data.

The header attaching circuit 702 attaches transmission headers to the coded moving-picture data 710 and sends out the resultant packet 712 to the transmission header compressor device 400.

In the transmission header compressor device 400, the compression/non-compression control 403 outputs a compression control signal 412, which inhibits compression (i.e. non-compression), once for a preselected number of packets sequentially received from the moving-picture encoder device 700. For this purpose, the control circuit 403 includes a timer or a counter by way of example. The control circuit 403 may be adapted to additionally output a compression control signal 412 that commands compression. Further, the control circuit 403 maybe adapted to output the above compression control signal 412 inhibiting compression, when the compressor 400 receives a data error report signal from a transmission header decompressor device, not shown, located downstream of the compressor device 400. The compression control signal 412 inhibiting compression is fed not only to the header compressor 401 but also to the moving-picture encoder 701 of the moving-picture encoder device 700.

The compression/non-compression control 403 may be adapted to send the compression control signal 412 inhibiting compression (non-compression) to the moving-picture encoder device 700 a predetermined period of time before it sends the above control signal 412 to the header compressor 401. The predetermined period of time may be an interval between the time when the moving-picture encoder 701 executes intra-frame coding with moving-picture data in response to the compression control signal 412 and the time when a packet including the coded moving-picture data arrives at the header compressor 401 over the connection 712.

In the instant, illustrative embodiment, upon receiving the compression control signal 412 inhibiting compression (non-compression), the header compressor 401 simply transfers a packet 712 received from the moving-picture encoder device 700 to the serial transmitter 402 without compressing its headers. Also, if the header compressor 401 receives the compression control signal 412 indicative of compression, or no compression control signal 412 indicative of inhibition (non-compression) the header compressor 401 then compresses the headers of the received packet 712 and then delivers the packet to the serial transmitter 402.

In the embodiments shown and described before this embodiment, the header compressors 101, 201 and 301 each determine whether or not to inhibit compression (non-compression) once for a preselected number of packets received from the moving-picture encoder. In the illustrative embodiment now described with reference to FIG. 8, such a decision function is represented by the compression/non-compression control 403.

The serial transmitter 402 functions in the same manner as in the foregoing embodiments.

In FIG. 8, the moving-picture encoder device 700 and transmission header compressor device 400 are interconnected with each other without the intermediary of a network. If desired, however, the two devices 700 and 400 may be interconnected with each other via a network as in the embodiment shown in FIGS. 6A and 6B.

In operation, the compression/non-compression control 403 determines a time for inhibiting the compression of the headers of a packet. The control circuit 403 then delivers a compression control signal 412 inhibiting compression to the header compressor 401 and the moving-picture encoder 701 of the moving-picture encoder device 700 at the above time.

In the moving-picture encoder device 700, the moving-picture encoder 701 usually encodes moving-picture data by either one of intra-frame coding and inter-frame coding in dependent upon the contents of the moving-picture data, or at a preselected time interval, etc. However, on receiving the compression control signal 412 indicative of non-compression from the transmission header compressor device 400, the moving-picture encoder 701 unconditionally encodes moving-picture data by intra-frame coding.

The header attaching circuit 702 attaches transmission headers to coded moving-picture data 710 output from the moving-picture encoder 701 without regard to the coding scheme, intra-frame or inter-frame coding, adopted. The header attaching circuit 702 sends out the resulting packet 712 to the transmission header compressor device 400.

The packet 712 is input to the header compressor 401. If the header compressor 401 receives the compression control signal 412 indicative of non-compression (inhibition) from the compression/non-compression control 403 at the same time as it receives the packet 712 from the encoder device 700, the header compressor 401 then simply transfers the received packet 712 to the serial transmitter 402. If the above compression control signal 412 is not fed to the header compressor 401, then the compressor 401 compresses the transmission headers of the packet 712 and outputs the resulting packet 410 to the serial transmitter 402. The serial transmitter accordingly sends out the compressed or non-compressed packet to the serial link 112.

The illustrative embodiment described above causes the moving-picture encoder 701 to execute intra-frame coding substantially at the same time as the compression of transmission headers. This successfully will promote a moving-picture decoder device, not shown, interconnected downstream to rapidly recover the reproduction of moving pictures from deterioration ascribable to, e.g., packet loss encountered on the serial link 112.

Modifications of the illustrative embodiments will specifically be described hereinafter. With the respective illustrative embodiments, whether or not to compress transmission headers is determined on the basis of whether or not intra-frame coding has been effected. Alternatively, such decision may be made on the basis of header information attached to moving-picture data. In this case, too, it can be understood that intra-frame coding is recognized although indirectly. For example, in order to prevent an error from being propagated when moving-picture data are lost, as so-called refreshing is periodically made, which is considered as a forcible intra-frame coding. If some information caused by refreshment of moving-picture data is involved, then the system may be adapted not to compress transmission headers.

The respective illustrative embodiments inhibit the compression of headers at a preselected period or on detecting intra-frame coding. The embodiments may additionally inhibit compression when a transmission header decompressor device reports an error in receiving data. It is to be noted that the decompressor device may be constructed to send out information to the transmission header compressor in both cases where it has correctly received data and where it has failed to do so.

Inhibition based on intra-frame coding executed by the embodiments shown in FIGS. 3, 5, and 6A and 6B and unconditional intra-frame coding based on inhibition executed by the embodiment shown in FIG. 8 may be combined, if desired.

Compression may be applied to all headers or part of headers attached to moving-picture data. For example, the present invention is practicable with all or part of the IP header 15, UDP header 16, RTP header 17 and picture header 18 shown in FIG. 7. Further, the present invention is practicable with a footer that may be attached to the end of data. In this sense, the word "header" is to broadly be understood as covering the sense of footer as well.

In summary, in accordance with the present invention, a timing at which a transmission header compressor inhibits compression is synchronous to a timing at which a moving-picture encoder executes intra-frame coding. Therefore, even when a packet with compressed headers is lost due to an error on a transmission path, a recovery time up to the correct decoding of moving-picture data is reduced. Moreover, packets unable to contribute to the decoding of moving-picture data are prevented from unduly occupying a transmission band.

The entire disclosure of Japanese patent application No. 2001-5960 filed on Jan. 15, 2001, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What we claim is:

1. A transmission header compressing device comprising:
a header compressor receiving a moving-picture signal including coded moving-picture data and a transmission header, and compressing the transmission header to transmit the moving-picture signal selectively with the compressed transmission header; and
a compression control circuit controlling said header compressor, and determining whether or not the moving-picture data included in the moving-picture signal are subjected to intra-frame coding to inhibit, if the moving-picture data are subjected to intra-frame coding, said header compressor from compressing the header.

2. The device in accordance with claim 1, wherein said compression control circuit references the moving-picture signal to determine whether or not the moving-picture data are subjected to intra-frame coding.

3. The device in accordance with claim 2, wherein the moving-picture signal additionally includes first information for use in determining whether or not to inhibit compression.

4. The device in accordance with claim 1, wherein said compression control circuit determines whether or not the moving-picture data are subjected to intra-frame coding on the basis of a decision signal, which is received in addition to the moving-picture signal for use in determining whether or not to inhibit compression.

5. The device in accordance with claim 1, wherein the moving-picture data are produced by dividing a frame of picture data vertically and horizontally into a plurality of blocks of data and executing a particular kind of coding with each of the plurality of blocks of data,
said compression control circuit determining that the moving-picture data of the moving-picture signal received are subjected to intra-frame coding if a ratio of blocks of data which are intra-frame coded to the entire frame of data is higher than a predetermined threshold.

6. A transmission header compressing device comprising:

a header compressor receiving a moving-picture signal including coded moving-picture data and a transmission header from a moving-picture coding device, and compressing the transmission header to transmit the moving-picture data selectively with the compressed transmission header;

a compression inhibiting circuit for inhibiting said header compressor from compressing the transmission header of the moving-picture signal under a rule; and an inhibition information transmitter for transmitting information indicating that the transmission header is inhibited from compression to the moving-picture coding device that has transmitted the moving-picture signal.

7. A moving-picture coding device comprising:

an encoder for coding moving-picture data selectively by intra-frame coding or inter-frame coding in dependence upon a content of the moving-picture data to transfer a resultant coded moving-picture signal to a transmission header compressing device, which follows said moving-picture coding device and compresses a transmission header;

a header attaching circuit attaching a transmission header to the coded moving-picture signal to form the moving-picture signal; and a decision information producing circuit producing first information for use in determining whether or not to inhibit the transmission header compressing device from compressing the transmission header in dependence upon whether or not intra-frame coding is executed, and transmitting the first information to the transmission header compressing device.

8. The device in accordance with claim 7, wherein said decision information producing circuit inserts the first information into the moving-picture signal to transmit the moving-picture signal including the first information to the transmission header compressing device.

9. The device in accordance with claim 7, wherein said decision information producing circuit transmits the first information to the transmission header compressing device in addition to the moving-picture signal.

10. The device in accordance with claim 7, wherein the moving-picture data are produced by dividing a frame of picture data vertically and horizontally into a plurality of blocks of data and executing a particular kind of coding on each of the plurality of blocks of data, said decision information producing circuit producing as the first information a ratio of blocks of data subjected to intra-frame coding to the entire frame of data.

11. A moving-picture coding device comprising:

an encoder coding moving-picture data selectively by intra-frame coding or inter-frame coding in dependence upon a content of the moving-picture data to produce resultant coded moving-picture data;

a header attaching circuit attaching a transmission header to the coded moving-picture data to form a moving-picture signal;

an inhibition information receiver for receiving decision information indicative of inhibition of compression of the transmission header from a transmission header compressing device, which follows said moving-picture coding device and compresses the transmission header;

a coding control circuit for controlling said encoder to select intra-frame coding in response to said inhibition information receiver receiving the decision information; and a transmitter transmitting the moving-picture signal to the transmission header compressing device.

12. A moving-picture transmission system comprising:

a moving-picture coding device for coding moving-picture data selectively by intra-frame coding or inter-frame coding in dependence upon a content of the moving-picture data and attaching a transmission header to resultant coded moving-picture data to output a moving-picture signal; and a transmission header compressing device for compressing the transmission header of the moving-picture signal received from said moving-picture coding device to output the moving-picture data selectively with the compressed transmission header;

said moving-picture coding device comprising a decision information producing circuit for producing first information for use in determining whether or not to inhibit said transmission header compressing device from compressing the transmission header in dependence upon whether or not intra-frame coding is executed, and inserting the first information into the moving-picture signal to transmit the first information to said transmission header compressing device.

13. A moving-picture transmission system comprising:

a moving-picture coding device for coding moving-picture data selectively by intra-frame coding or inter-frame coding in dependence upon a content of the moving-picture data and attaching a transmission header to resultant coded moving-picture data to output a moving-picture signal; and a transmission header compressing device receiving the moving-picture signal from said moving-picture coding device, and compressing a transmission header of the moving-picture signal received to output the moving-picture signal selectively with the compressed transmission header;

said moving-picture coding device comprising:

an inhibition information receiver receiving first information indicative of inhibition of compression of the transmission header from said transmission header compressing device; and an encoder selectively coding intra-frame coding in response to said inhibition information receiver receiving the first information;

said transmission header compressing device comprising:

a compression circuit selectively compressing the transmission header of the moving-picture signal, and inhibiting the transmission header from being compressed under a rule; and an inhibition information transmitter for transmitting second information indicative of inhibition of compression to said moving-picture coding device.

14. A transmission header compressing device comprising:

a header compressor receiving a moving-picture signal including coded moving-picture data and a transmission header from a moving-picture coding device, and compressing the transmission header to transmit the moving-picture data selectively with the compressed transmission header, the moving-picture data being produced by dividing a frame of picture data vertically and horizontally into a plurality of blocks of data and executing either of intra-frame and inter-frame coding on each of the plurality of blocks of data;

a compression control circuit for controlling said header compressor; and an inhibition information transmitter for transmitting first information indicative of inhibition of compression to the moving-picture coding device;

said compression control circuit determining that the moving-picture data of the moving-picture signal received are subjected to intra-frame coding if a ratio of blocks of data which are intra-frame coded to the entire frame of data is higher than a predetermined threshold to inhibit said header compressor from compressing the transmission header of the moving-picture signal.

15. The device in accordance with claim 14, wherein the moving-picture signal additionally includes the first information.

16. The device in accordance with claim 14, wherein said compression control circuit determines whether or not the moving-picture data are subjected to intra-frame coding on the basis of a decision signal, which is received in addition to the moving-picture signal for use in determining whether or not to inhibit compression.

* * * * *